United States Patent
Kim

(10) Patent No.: US 10,746,059 B2
(45) Date of Patent: Aug. 18, 2020

(54) EXHAUST DIFFUSER HAVING EJECTION HOLE AND SUCTION HOLE, AND GAS TURBINE HAVING THE SAME

(71) Applicant: DOOSAN HEAVY INDUSTRIES & CONSTRUCTION CO., LTD., Changwon, Gyeongsangnam-do (KR)

(72) Inventor: Dae Hyun Kim, Seongnam-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 277 days.

(21) Appl. No.: 15/708,678

(22) Filed: Sep. 19, 2017

(65) Prior Publication Data

US 2018/0313231 A1    Nov. 1, 2018

(30) Foreign Application Priority Data

Apr. 28, 2017    (KR) .................. 10-2017-0055164

(51) Int. Cl.
  *F01D 25/30*    (2006.01)
  *F02C 3/04*    (2006.01)
  *F04D 29/68*    (2006.01)

(52) U.S. Cl.
  CPC .............. *F01D 25/305* (2013.01); *F02C 3/04* (2013.01); *F04D 29/682* (2013.01);
  (Continued)

(58) Field of Classification Search
  CPC .......... F01D 25/305; F01D 25/30; F01D 9/02; F02C 3/04; F04D 29/682; F04D 29/684;
  (Continued)

(56) References Cited

U.S. PATENT DOCUMENTS 2,656,096 A    10/1953 Schwarz
2,729,974 A    1/1956 Lee et al.
(Continued)

FOREIGN PATENT DOCUMENTS

DE    102010022418 A1    12/2011
EP    0093462 A1    11/1983
(Continued)

OTHER PUBLICATIONS

A Japanese Office Action dated Jul. 24, 2018 in connection with Japanese Patent Application No. 2017-175813 which corresponds to the above-referenced U.S. application.
(Continued)

*Primary Examiner* — Arun Goyal
*Assistant Examiner* — Henry Ng
(74) *Attorney, Agent, or Firm* — Invenstone Patent, LLC

(57) ABSTRACT

An exhaust diffuser that is mounted at an outlet of a gas turbine to eject exhaust gas to the outside and includes hollow cylindrical internal diffuser guide and external diffuser guide. Further, the exhaust diffuser includes struts disposed between the internal diffuser guide and the external diffuser guide to space the internal diffuser guide and the external diffuser guide at a predetermined distance from each other, ejection areas formed on an outer side of the internal diffuser guide and having ejection holes for ejecting exhaust gas in a flow direction of exhaust gas, and suction areas formed on the outer side of the internal diffuser guide, disposed close to the ejection areas, and having suction holes for suctioning exhaust gas in the opposite direction to a flow direction of the ejected exhaust gas.

12 Claims, 12 Drawing Sheets

(52) U.S. Cl.
CPC ........ *F04D 29/684* (2013.01); *F05D 2220/32* (2013.01); *F05D 2240/12* (2013.01); *F05D 2240/35* (2013.01); *F05D 2250/324* (2013.01); *F05D 2270/17* (2013.01)

(58) Field of Classification Search
CPC ............. F05D 2220/32; F05D 2240/12; F05D 2240/35; F05D 2250/324; F05D 2270/17
See application file for complete search history.

(56) References Cited

U.S. PATENT DOCUMENTS

| | | | |
|---|---|---|---|
| 2,948,148 | A | 8/1960 | Louis et al. |
| 4,515,524 | A | 5/1985 | Fisher, Jr. |
| 5,467,591 | A | 11/1995 | Hozzuto |
| 8,776,527 | B1 | 7/2014 | Sokhey et al. |
| 2004/0091350 | A1 | 5/2004 | Graziosi et al. |
| 2009/0263243 | A1 | 10/2009 | Little et al. |
| 2011/0058939 | A1 | 3/2011 | Orosa |
| 2016/0273390 | A1* | 9/2016 | Mihalic ................... F01D 25/30 |

FOREIGN PATENT DOCUMENTS

| | | |
|---|---|---|
| EP | 2615262 A2 | 7/2013 |
| JP | S59192699 U | 12/1984 |
| JP | 2004-162715 A | 6/2004 |
| JP | 2013-142401 A | 7/2013 |
| JP | 2013-194648 A | 9/2013 |
| KR | 10-1501833 B1 | 3/2015 |
| KR | 1020150123950 A | 11/2015 |
| KR | 1020160007683 A | 1/2016 |
| WO | 2010010277 A1 | 1/2010 |
| WO | 2014158338 A1 | 10/2014 |
| WO | 2016001002 A1 | 1/2016 |

OTHER PUBLICATIONS

A Japanese Office Action dated Dec. 4, 2018 in connection with Japanese Patent Application No. 2017-175813 which corresponds to the above-referenced U.S. application.

* cited by examiner

101

FLOW DIRECTION

FLOW DIRECTION

EXHAUST DIFFUSER HAVING EJECTION HOLE AND SUCTION HOLE, AND GAS TURBINE HAVING THE SAME

CROSS REFERENCE TO RELATED APPLICATION

The present application claims priority to Korean Patent Application No. 10-2017-0055164, filed Apr. 28, 2017, the entire contents of which is incorporated herein by reference.

BACKGROUND

The present disclosure relates to an exhaust diffuser and a gas turbine having the same and, more particularly, to an exhaust diffuser having an ejection hole and a suction hole, and a gas turbine having the exhaust diffuser.

In general, as shown in FIG. 1, a gas turbine 10 is composed of a compressor 15, a combustor 25, and a turbine 40. Air flowing inside through an air inlet 20 is compressed into high-temperature and high-pressure compressed air by the compressor 15. High-temperature and high-pressure combustion gas 35 (working fluid) is produced by combusting the compressed air by supplying fuel 30 to the compressed air in the combustor 25. The turbine 40 is operated by the combustion gas 35, and a power generator 50 connected to the compressor 15 is operated.

One important aerodynamic problem encountered during normal operation of a gas turbine engine 10 is to efficiently discharge combustion gas flowing out with high momentum through the last stage 60 of a turbine 40. It may be aerodynamically advantageous to configure a horizontal exhaust line, but axial exhaust may be substantially impossible due to influence on the entire footprint. For this reason, it is standard in the field to use vertical and side exhaust stacks that change the flow of combustion gas from an axial direction into the radial direction.

In detail, a radial diffuser may be used to guide combustion gas into the radial direction. As shown in FIG. 2, a radial diffuser 100' generally includes a plurality of struts 140' mounted on an internal diffuser guide 150' and surrounded by an external diffuser guide 130'. The radial diffuser 100' changes the kinetic energy of the combustion gas flowing out through the last stage of the turbine into potential energy of increased static pressure. Increasing the entire restoration of static pressure increases the performance and efficiency of the entire gas turbine engine. Accordingly, there has been an effort to develop an improved diffuser and an improved exhaust system to be used for gas turbine engines.

Several technologies for preventing flow separation by controlling the boundary layer of the flow at the inlet of a diffuser have been developed in correspondence to the above efforts. However, according to the technologies, it is very difficult to prevent flow separation between an internal diffuser guide and struts. Such flow separation causes a loss of pressure and consequently reduces the performance of the entire combustor. Therefore, there has been an effort to develop an exhaust diffuser that can solve the problems in the related art.

SUMMARY

An object of the present disclosure is to provide an exhaust diffuser of which performance is improved by improving aerodynamic performance by preventing partial separation of exhaust gas flowing in the exhaust diffuser, and a gas turbine having the exhaust diffuser.

The exhaust diffuser according to an aspect of the present disclosure is mounted at an outlet of a gas turbine to eject exhaust gas to the outside and includes hollow cylindrical internal diffuser guide and external diffuser guide. Further, the exhaust diffuser includes struts disposed between the internal diffuser guide and the external diffuser guide to space the internal diffuser guide and the external diffuser guide at a predetermined distance from each other, ejection areas formed on an outer surface of the internal diffuser guide and having ejection holes for ejecting compressed air in a flow direction of exhaust gas, and suction areas formed on the outer surface of the internal diffuser guide, disposed close to the ejection areas, and having suction holes for suctioning exhaust gas in the opposite direction to a flow direction of the ejected exhaust gas.

The ejection holes may be slits extending a predetermined distance in the flow direction of exhaust gas.

The ejection holes may be spaced at a predetermined distance from each other on the outer surface of the internal diffuser guide.

The ejection holes may be arranged in one or more rows on the outer surface of the internal diffuser guide.

The ejection holes may have a circular shape and may be spaced at a predetermined distance from each other in the flow direction of the exhaust gas.

The ejection direction of the ejection holes may form a predetermined angle with an outer surface of an internal diffuser.

The suction direction of the suction holes may form a predetermined angle with an outer side of an internal diffuser.

The ejection areas each may have an ejection groove formed at a predetermined depth on the outer surface of the internal diffuser guide and have a an exhaust gas channel and an ejection hole therein, and a slope formed in an ejection direction of exhaust gas, and a stepped portion continuing from the slope and formed inside at a predetermined distance from a maximum outer diameter of the internal diffuser guide.

The ejection groove may be formed in a ring shape around the outer surface of the internal diffuser guide.

The slope of the ejection groove may be curved with a predetermined radius of curvature.

The suction areas each may have a suction groove formed at a predetermined depth on the outer surface of the internal diffuser guide and have an exhaust gas suction channel and a suction hole therein, and a slope having an incline formed in an opposite direction to a suction direction of exhaust gas.

The suction area may have a shutter mounted over the suction groove to be slide in the flow direction of exhaust gas and opening or closing the suction hole by sliding.

The shutter may cover the entire suction groove of the suction area when closing the suction hole, and an outer surface of the shutter may continue from the outer surface of the internal diffuser guide.

A gas turbine according to another aspect of the present disclosure has an exhaust diffuser including hollow cylindrical internal diffuser guide and external diffuser guide. The exhaust diffuser includes struts disposed between the internal diffuser guide and the external diffuser guide to space the internal diffuser guide and the external diffuser guide at a predetermined distance from each other, ejection areas formed on an outer surface of the internal diffuser guide and having ejection holes for ejecting exhaust gas in a flow direction of exhaust gas, and suction areas formed on the outer surface of the internal diffuser guide, disposed close to the ejection areas, and having suction holes for suctioning exhaust gas in the opposite direction to a flow direction of the ejected exhaust gas.

The ejection areas each may have an ejection groove formed at a predetermined depth on the outer surface of the internal diffuser guide and have an exhaust gas channel and an ejection hole therein, and a slope formed in an ejection direction of exhaust gas, and a stepped portion continuing from the slope and formed inside at a predetermined distance from a maximum outer diameter of the internal diffuser guide.

The suction areas each may have a suction groove formed at a predetermined depth on the outer surface of the internal diffuser guide and have an exhaust gas suction channel and a suction hole therein, and a slope having an incline formed in an opposite direction to a suction direction of exhaust gas.

As described above, according to the exhaust diffuser of the present disclosure, since there are provided struts, ejection areas, and suction areas that are formed in a specific structure, it is possible to provide an exhaust diffuser of which performance is improved by improving aerodynamic performance by preventing partial separation of exhaust gas flowing in the exhaust diffuser, and a gas turbine having the exhaust diffuser.

Further, according to the exhaust diffuser of the present disclosure, since there are provided ejection areas having ejection slits or ejection holes arranged in a predetermined pattern, it is possible to effectively prevent partial separation on the outer surface of the internal diffuser guide between the struts. Accordingly, it is possible to provide an exhaust diffuser of which performance is improved by improving aerodynamic performance, and a gas turbine having the exhaust diffuser.

Further, according to the exhaust diffuser of the present disclosure, since there are provided ejection areas having ejection channels, ejection holes, ejection grooves, and stepped portions, it is possible to effectively prevent partial separation on the outer surface of the internal diffuser guide between the struts. Accordingly, it is possible to provide an exhaust diffuser of which performance is improved by improving aerodynamic performance, and a gas turbine having the exhaust diffuser.

Further, according to the exhaust diffuser of the present disclosure, since there are provided suction areas having suction grooves having a specific structure, it is possible to reduce a boundary layer by instantaneously suctioning flow around a separation point in consideration of an increase in thickness of the boundary layer when flow separation occurs. Accordingly, it is possible to provide an exhaust diffuser of which performance is improved by improving aerodynamic performance, and a gas turbine having the exhaust diffuser.

Further, according to the exhaust diffuser of the present disclosure, since there are provided shutters having a specific structure, it is possible to prevent backward flow of a boundary layer or unnecessary operation by closing the suction holes with the shutters when flow separation control is not used, whereby it is possible to save energy. Therefore, it is possible to provide an exhaust diffuser of which performance is improved by improving aerodynamic performance, and a gas turbine having the exhaust diffuser.

According to the gas turbine of the present disclosure, since it has an exhaust diffuser having a specific structure, it is possible to improve aerodynamic performance by removing partial separation of exhaust gas flowing in the exhaust diffuser, so it is possible to provide a gas turbine that can improve diffuser performance.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, exemplary embodiments of the present disclosure are described in detail with reference to the drawings. The terms and words used in the present specification and claims should not be interpreted as being limited to typical meanings or dictionary definitions, but should be interpreted as having meanings and concepts relevant to the technical scope of the present disclosure.

It should be understood that when an element is referred to as being "on" another element, the elements may be in contact with each other or there may be an intervening element present. Through the present specification, unless explicitly described otherwise, "comprising" any components will be understood to imply the inclusion of other components rather than the exclusion of any other components.

Figure 1:
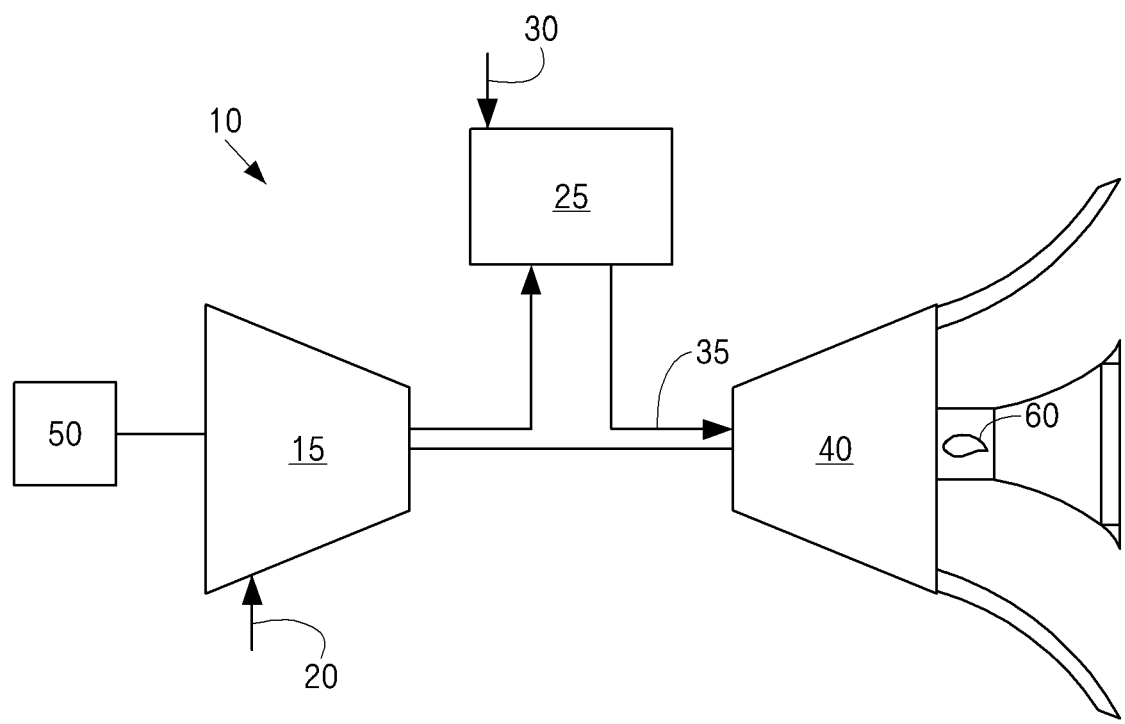
FIG. 1 is a view showing a conventional configuration of a gas turbine.
Figure 2:
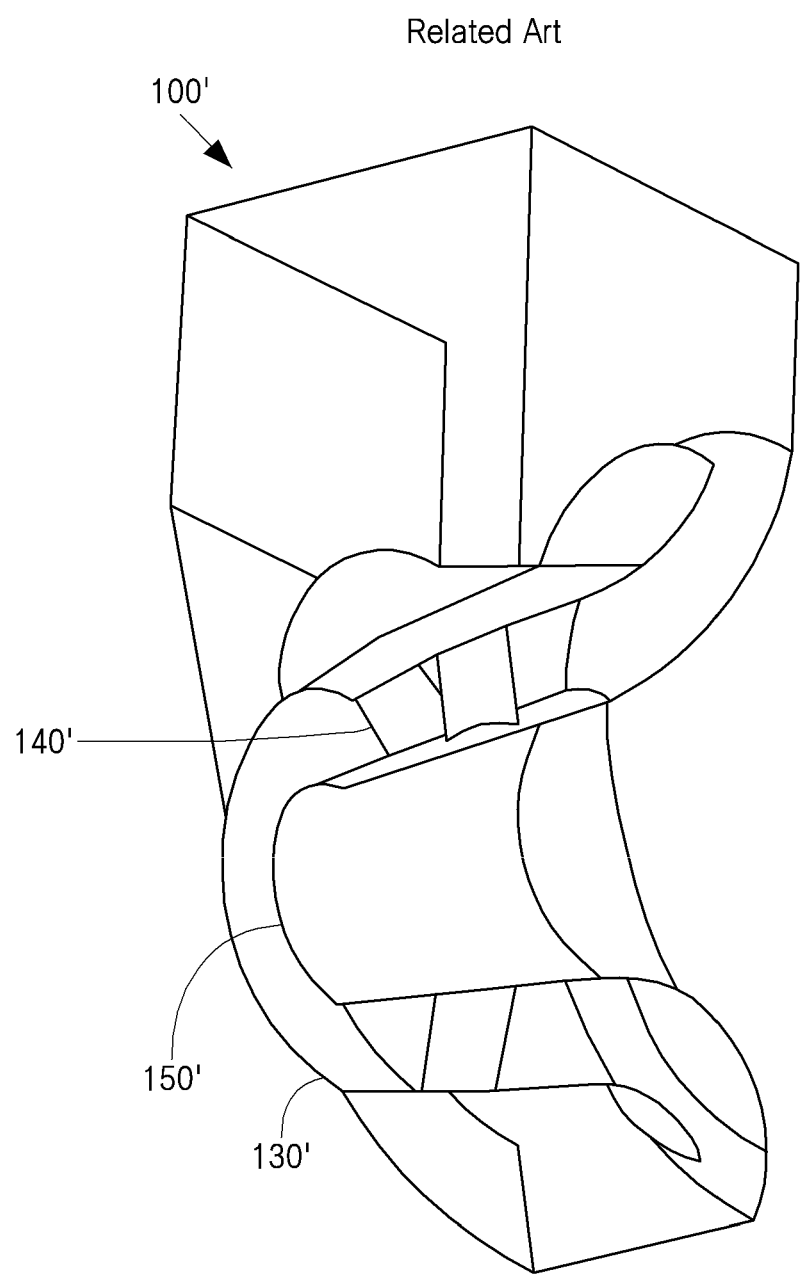
FIG. 2 is a schematic view showing a conventional exhaust diffuser.
Figure 3:
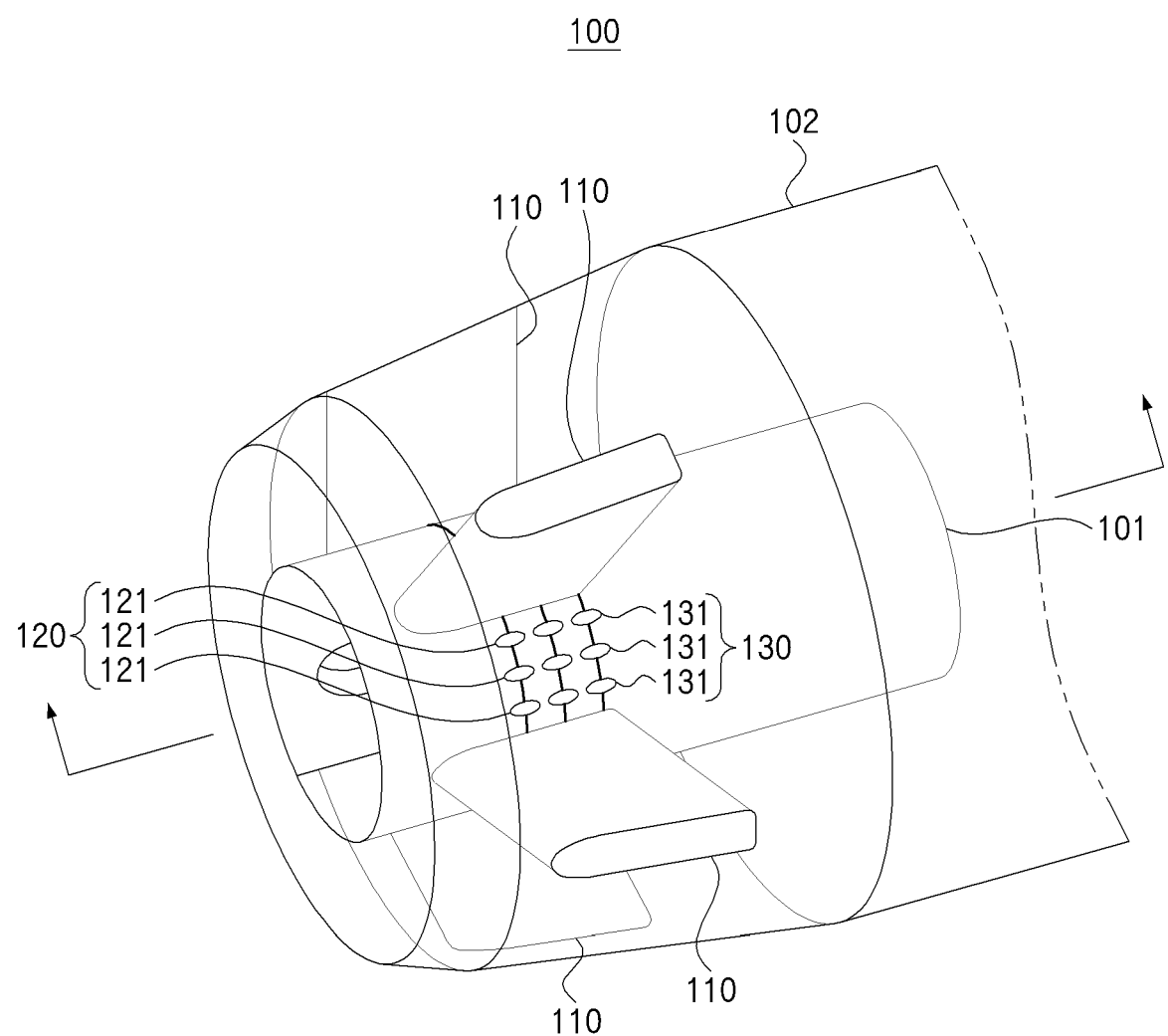
FIG. 3 is a perspective view showing an exhaust diffuser according to an exemplary embodiment of the present disclosure.
Figure 4:
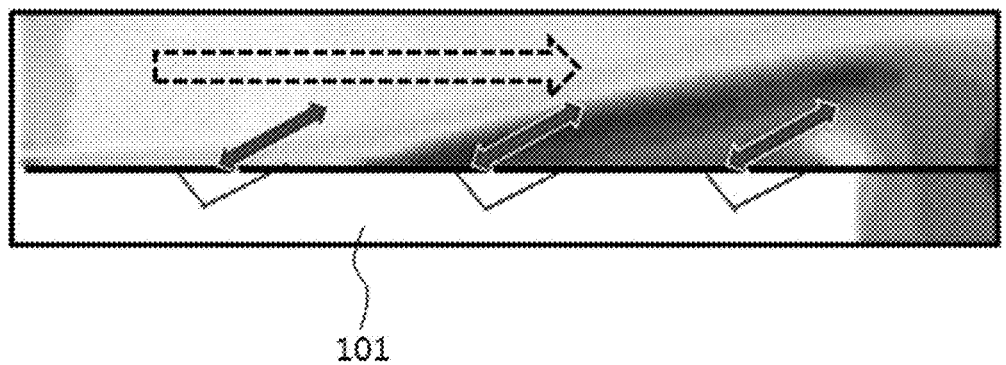
FIG. 4 is a view showing flow separation on the outer surface of an internal diffuser guide.

FIG. 3 is a perspective view showing an exhaust diffuser according to an exemplary embodiment of the present disclosure. FIG. 4 is a view showing flow separation on the outer surface of an internal diffuser guide.

Referring to FIG. 4, flow separation where exhaust gas gradually separates from the outer surface of an internal diffuser guide while flowing on the surface can be seen.

When flow separation occurs, backward flow is generated opposite to the separated flow, so efficiency is reduced due to flow resistance.

Referring to FIG. 3, an exhaust diffuser 100 according to the exemplary embodiment includes hollow cylindrical internal diffuser guide 101 and external diffuser guide 102 and further includes struts 110, ejection areas 120, and suction areas 130 that are formed in a specific structure. Accordingly, it is possible to prevent the flow separation as shown in FIG. 4 from occurring on the outer surface of the internal diffuser guide 101. Further, according to the present disclosure, it is possible to improve aerodynamic performance by preventing partial separation of exhaust gas flowing in the exhaust diffuser 100, so it is possible to provide an exhaust diffuser of which performance is improved, and a gas turbine having the exhaust diffuser.

The components of the exhaust diffuser 100 according to the exemplary embodiment are described hereafter in detail with reference to the drawings.

As shown in FIG. 3, the struts 110 according to the exemplary embodiment are disposed between the internal diffuser guide 101 and the external diffuser guide 102 to space the internal diffuser guide 101 and the external diffuser guide 102 at a predetermined distance. The ejection areas 120 are formed on the outer surface of the internal diffuser guide 101 and have ejection holes 121 for ejecting compressed air in the flow direction of exhaust gas. The suction areas 130 are formed on the outer surface of the internal diffuser guide 101, are disposed close to the ejection areas 120, and have suction holes 131 for suctioning exhaust gas in the opposite direction to the flow direction of the ejected exhaust gas.

Figure 5:
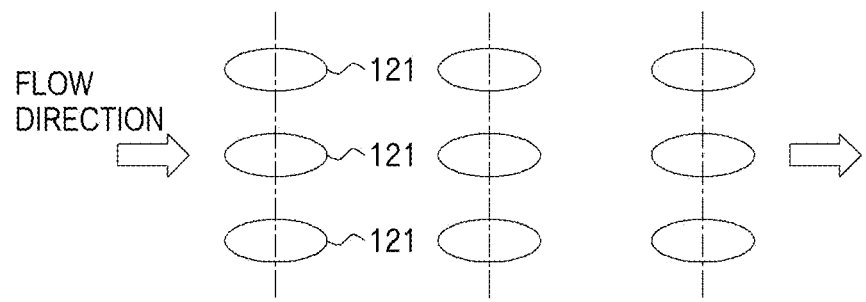
FIG. 5 is a plan view showing ejection holes of ejection areas according to an exemplary embodiment of the present disclosure.
Figure 6:
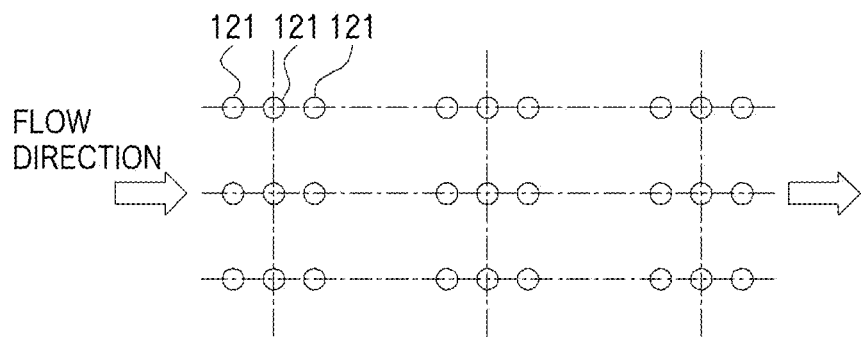
FIG. 6 is a plan view showing ejection holes of ejection areas according to another exemplary embodiment of the present disclosure.

FIG. 5 is a plan view showing ejection holes of ejection areas according to an exemplary embodiment of the present disclosure. FIG. 6 is a plan view showing ejection holes of ejection areas according to another exemplary embodiment of the present disclosure.

As shown in FIG. 5, the ejection holes 121 according to the exemplary embodiment may be slits extending a predetermined distance in the flow direction of exhaust gas. The ejection holes 121, as shown in FIGS. 3 and 5, are spaced from each other at a predetermined distance on the outer surface of the internal diffuser guide 101, and may be arranged in one or more rows on the outer surface of the internal diffuser guide 101. If necessary, as shown in FIG. 6, the ejection holes 121 according to the exemplary embodiment may have a circular shape and two or more ejection holes 121 may be arranged at a predetermined distance from each other in the flow direction of exhaust gas.

Figure 7:
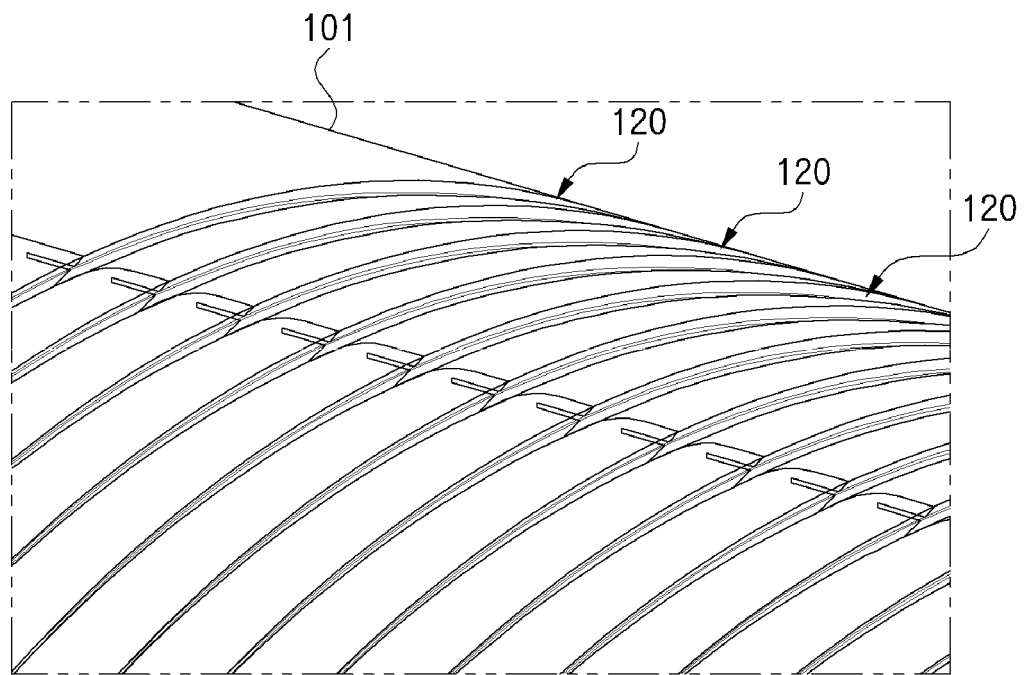
FIG. 7 is a partial perspective view showing ejection areas according to an exemplary embodiment of the present disclosure.
Figure 8:
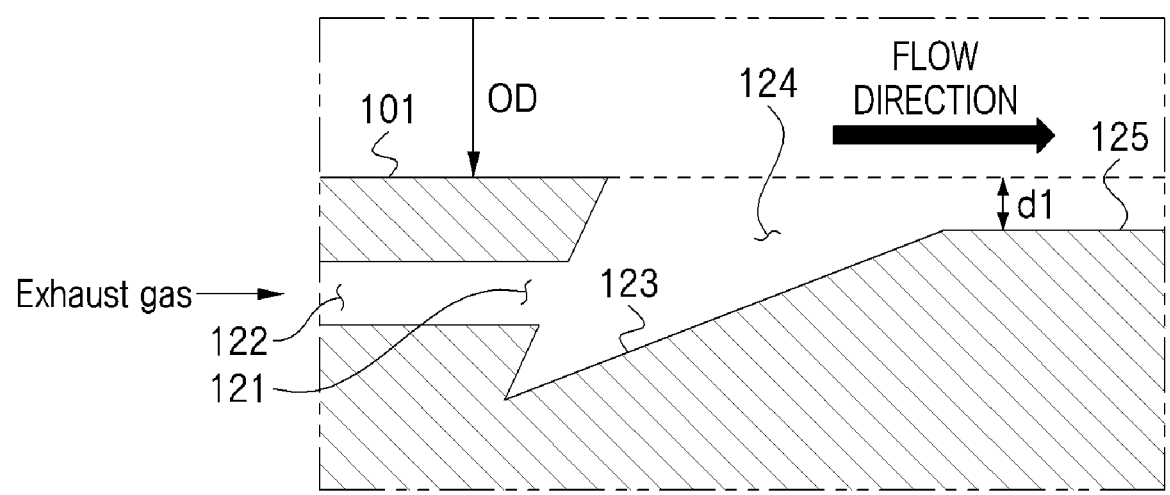
FIG. 8 is a partial cross-sectional view showing an ejection area according to an exemplary embodiment of the present disclosure.
Figure 9:
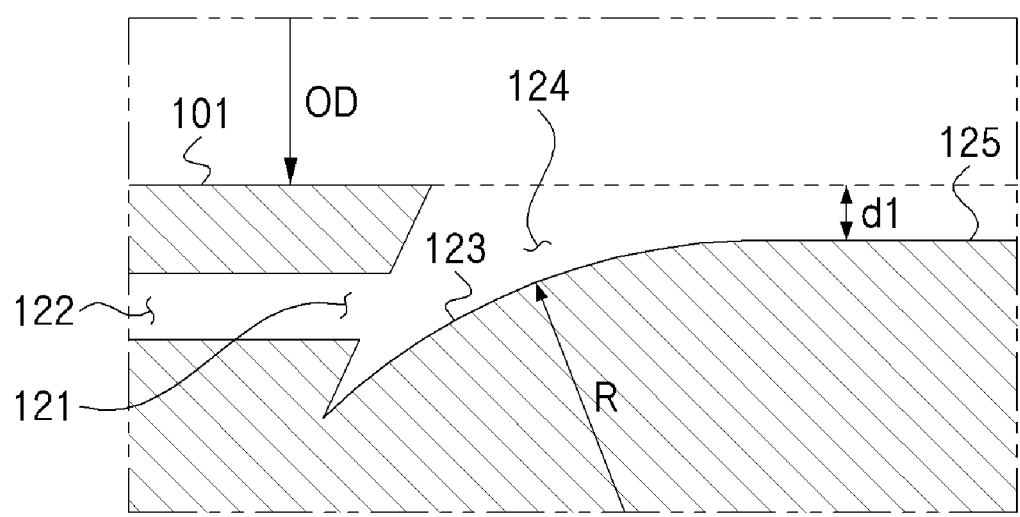
FIG. 9 is a partial cross-sectional view showing an ejection area according to another exemplary embodiment of the present disclosure.

FIG. 7 is a partial perspective view showing ejection areas according to an exemplary embodiment of the present disclosure. FIG. 8 is a partial cross-sectional view showing an ejection area according to an exemplary embodiment of the present disclosure. FIG. 9 is a partial cross-sectional view showing an ejection area according to another exemplary embodiment of the present disclosure.

Referring to FIGS. 7-9, the ejection areas 120 according to the exemplary embodiment may have an ejection groove 124 and a stepped portion 125 that are formed in a specific structure.

In detail, the ejection groove 124 may be formed at a predetermined depth on the outer surface of the internal diffuser guide 101 and may have an exhaust gas channel 122 and an ejection hole 121 therein, and a slope 123 formed in the ejection direction of exhaust gas. The slope 123 may be a flat surface, as shown in FIG. 8, or may be curved, as shown in FIG. 9.

The stepped portion 125, as shown in FIGS. 8 and 9, continues from the slope 123 and is formed inside at a predetermined distance from the maximum outer diameter OD of the internal diffuser guide 101. The ejection groove 124 in the ejection area 120 according to the exemplary embodiment, as shown in FIG. 7, may be formed in a ring shape around the outer side of the internal diffuser guide 101.

As shown in FIG. 9, the slope 123 of the ejection groove 124 may be curved with a predetermined radius of curvature R. Accordingly, it is possible to more stably guide exhaust gas that is ejected.

Figure 10:
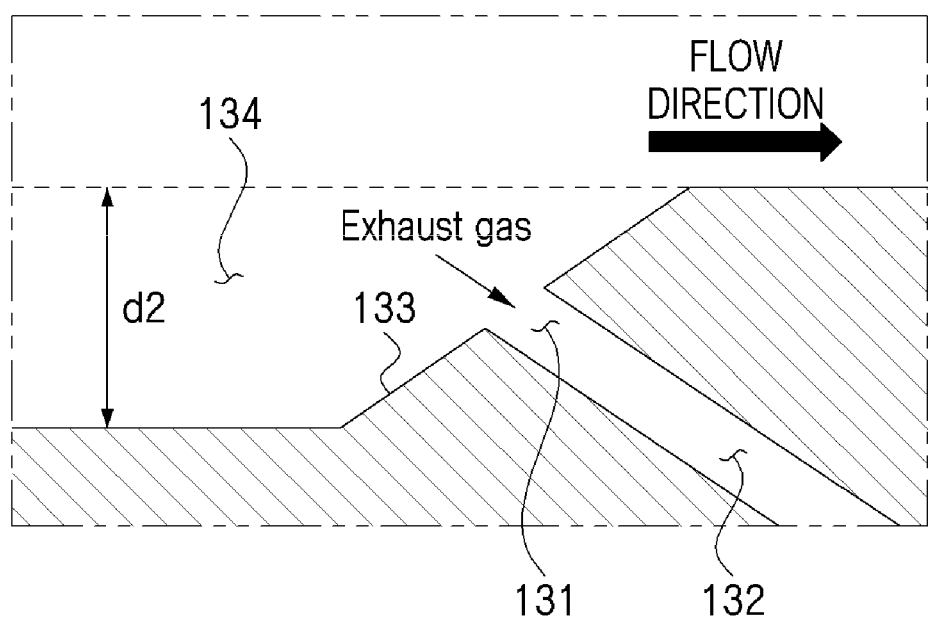
FIG. 10 is a partial cross-sectional view showing a suction area according to an exemplary embodiment of the present disclosure.
Figure 11:
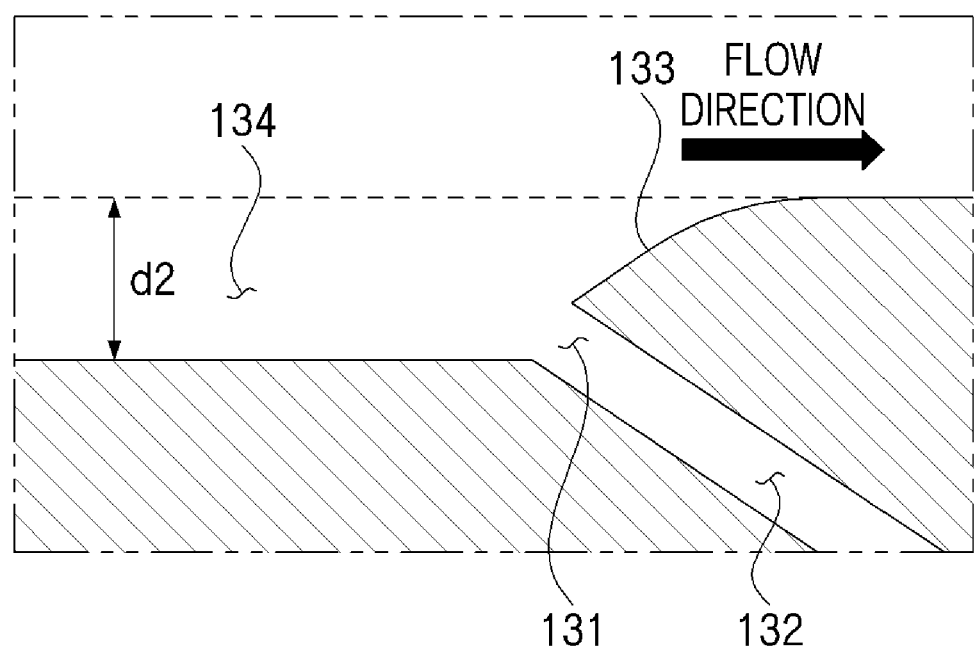
FIG. 11 is a partial cross-sectional view showing a suction area according to another exemplary embodiment of the present disclosure.

FIG. 10 is a partial cross-sectional view showing a suction area according to an exemplary embodiment of the present disclosure. FIG. 11 is a partial cross-sectional view showing a suction area according to another exemplary embodiment of the present disclosure.

Referring to FIGS. 10 and 11, a suction area 130 according to the exemplary embodiment has a suction groove 134 having a specific structure.

In detail, the suction groove 134 may be formed at a predetermined depth d2 on the outer surface of the internal diffuser guide 101 and may have an exhaust gas suction channel 132 and a suction hole 131 therein, and a slope 133 having an incline formed in the opposite direction to the ejection direction of exhaust gas.

If necessary, as shown in FIGS. 10 and 11, the positions of the suction channel 132 and the suction hole 131 may be appropriately changed with respect to the slope 133. Further, the slope 133 may also be curved with a predetermined radius of curvature to stably guide exhaust gas that is ejected.

Figure 12:
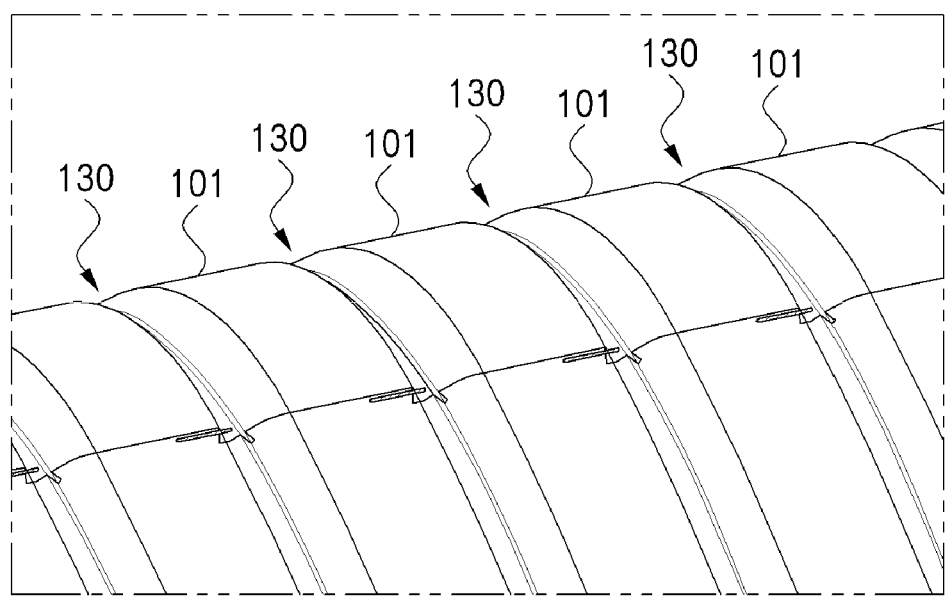
FIG. 12 is a partial perspective view showing suction areas according to yet another exemplary embodiment of the present disclosure.
Figure 13A:
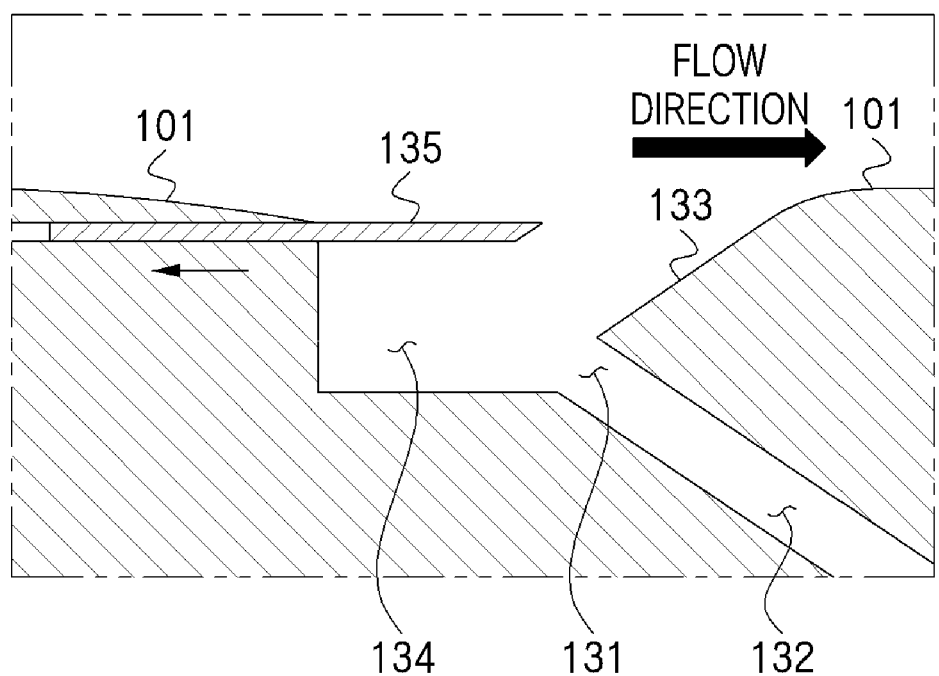
FIGS. 13A and 13B are partial cross-sectional views showing a suction area according to still yet another exemplary embodiment of the present disclosure.
Figure 13B:
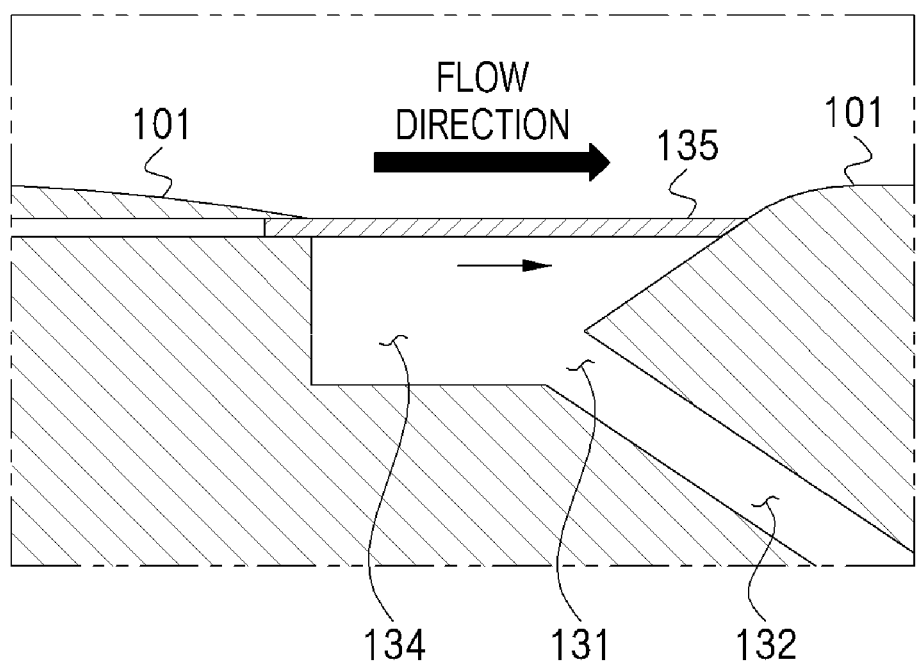

FIG. 12 is a partial perspective view showing suction areas according to another exemplary embodiment of the present disclosure. FIGS. 13A and 13B are partial cross-sectional views showing a suction area according to yet another exemplary embodiment of the present disclosure.

Referring to FIGS. 12, 13A and 13B, a suction area 130 according to the exemplary embodiment has a shutter 135 for opening and closing the suction hole 131 by sliding. The shutter 135 may be mounted over the suction groove 134 to be able to slide in the flow direction of exhaust gas.

As shown in FIG. 13B, when the shutter 135 closes the suction hole 131, it may cover the entire suction groove 134 of the suction area 130 such that the outer surface of the internal diffuser guide 101 has a continuous surface.

In this exemplary embodiment, it is possible to selectively allow flow to the suction area 130 using the shutter 135. Accordingly, it is possible to prevent backward flow of a boundary layer or unnecessary operation by closing the suction hole 131 with the shutter 135 when flow separation control is not used, whereby it is possible to save energy.

As described above, according to the exhaust diffuser of the present disclosure, since there are provided struts, ejection areas, and suction areas that are formed in a specific structure, it is possible to provide an exhaust diffuser of which performance is improved by improving aerodynamic performance by preventing partial separation of exhaust gas flowing in the exhaust diffuser, and a gas turbine having the exhaust diffuser.

Further, according to the exhaust diffuser of the present disclosure, since there are provided ejection areas having ejection slits or ejection holes arranged in a predetermined pattern, it is possible to effectively prevent partial separation on the outer surface of the internal diffuser guide between the struts. Accordingly, it is possible to provide an exhaust diffuser of which performance is improved by improving aerodynamic performance, and a gas turbine having the exhaust diffuser.

Further, according to the exhaust diffuser of the present disclosure, since there are provided ejection areas having ejection channels, ejection holes, ejection grooves, and stepped portions, it is possible to effectively prevent partial separation on the outer side of the internal diffuser guide between the struts. Accordingly, it is possible to provide an exhaust diffuser of which performance is improved by improving aerodynamic performance, and a gas turbine having the exhaust diffuser.

Further, according to the exhaust diffuser of the present disclosure, since there are provided suction areas having suction grooves having a specific structure, it is possible to reduce a boundary layer by instantaneously suctioning flow around a separation point in consideration of an increase in thickness of the boundary layer when flow separation occurs. Accordingly, it is possible to provide an exhaust diffuser of which performance is improved by improving aerodynamic performance, and a gas turbine having the exhaust diffuser.

Further, according to the exhaust diffuser of the present disclosure, since there are provided shutters having a specific structure, it is possible to prevent backward flow of a boundary layer or unnecessary operation by closing the suction holes with the shutters when flow separation control is not used, whereby it is possible to save energy. Therefore, it is possible to provide an exhaust diffuser of which performance is improved by improving aerodynamic performance, and a gas turbine having the exhaust diffuser.

Only specific exemplary embodiments of the present disclosure are described above. Accordingly, it should understood that the present disclosure is not limited to the specific exemplary embodiments, but that all modifications, equivalents, and substitutions should be construed as being included in the scope of the present disclosure as defined in the claims.

That is, the present disclosure is not limited to the specific exemplary embodiments described above, but other variations may be implemented without departing from the spirit of the present disclosure as defined in claims.

What is claimed is:

1. An exhaust diffuser of a gas turbine for ejecting exhaust gas, comprising:
    a hollow cylindrical internal diffuser guide extending from an upstream end to a downstream end, the upstream end having a maximum outer diameter equal to that of the downstream end;
    an external diffuser guide;
    struts disposed between the internal diffuser guide and the external diffuser guide to space the internal diffuser guide and the external diffuser guide at a predetermined distance from each other;
    an ejection area formed on an outer surface of the internal diffuser guide, the ejection area including ejection holes for ejecting the exhaust gas transferred from a turbine section of the gas turbine in a flow direction of the exhaust gas; and
    a suction area formed on the outer surface of the internal diffuser guide and disposed close to the ejection area, the suction area including suction holes for suctioning the exhaust gas in a direction radially opposite to a flow direction of the ejected exhaust gas,
    wherein the ejection area further includes:
        an ejection groove formed between the upstream end and the downstream end at a predetermined depth from the outer surface of the internal diffuser guide,
        an exhaust gas channel,
        a slope having an incline formed in an ejection direction of the exhaust gas, and
        a stepped portion continuing from the slope and formed inside the ejection groove at a predetermined distance from the maximum outer diameter of the internal diffuser guide such that a maximum outer diameter of the ejection groove is less than the maximum outer diameter of the internal diffuser guide.

2. The exhaust diffuser of claim 1, wherein the ejection holes are spaced at a predetermined distance from each other on the outer surface of the internal diffuser guide.

3. The exhaust diffuser of claim 2, wherein the ejection holes are arranged in one or more rows on the outer surface of the internal diffuser guide.

4. The exhaust diffuser of claim 1, wherein the ejection direction of the ejection holes is at a predetermined angle with the outer surface of the internal diffuser guide.

5. The exhaust diffuser of claim 1, wherein a suction direction of the suction holes is at a predetermined angle with the outer surface of the internal diffuser guide.

6. The exhaust diffuser of claim 1, wherein the ejection groove is a ring shape around the outer surface of the internal diffuser guide.

7. The exhaust diffuser of claim 1, wherein the slope of the ejection groove is curved with a predetermined radius of curvature.

8. The exhaust diffuser of claim 1, wherein the suction area includes
    a suction groove formed at a predetermined depth from the outer surface of the internal diffuser guide,
    an exhaust gas suction channel, and
    a slope having an incline formed in a direction radially opposite to a suction direction of the exhaust gas.

9. The exhaust diffuser of claim 8, wherein the suction area further includes a shutter mounted above the suction groove configured to slide in the flow direction of the exhaust gas to open or close each of the suction holes.

10. The exhaust diffuser of claim 9, wherein the shutter is configured to cover the entire suction groove of the suction area such that the outer surface of the internal diffuser guide is continuous over the suction groove.

11. A gas turbine, comprising:
    a compressor section;
    a combustor;
    a turbine section; and
    an exhaust diffuser,
    wherein the exhaust diffuser includes
    a hollow cylindrical internal diffuser guide extending from an upstream end to a downstream end, the upstream end having a maximum outer diameter equal to that of the downstream end,
    an external diffuser guide,
    struts disposed between the internal diffuser guide and the external diffuser guide to space the internal diffuser guide and the external diffuser guide at a predetermined distance from each other,
    an ejection area formed on an outer surface of the internal diffuser guide, the ejection area including ejection holes for ejecting exhaust gas transferred from the turbine section in a flow direction of the exhaust gas, and
    a suction area formed on the outer surface of the internal diffuser guide and disposed close to the ejection area, the suction area including suction holes for suctioning the exhaust gas in a direction radially opposite to a flow direction of the ejected exhaust gas, wherein the ejection area further includes:

an ejection groove formed between the upstream end and the downstream end at a predetermined depth from the outer surface of the internal diffuser guide, an exhaust gas channel, a slope having an incline formed in an ejection direction of the exhaust gas, and a stepped portion continuing from the slope and formed inside the ejection groove at a predetermined distance from the maximum outer diameter of the internal diffuser guide such that a maximum outer diameter of the ejection groove is less than the maximum outer diameter of the internal diffuser guide.

12. The gas turbine of claim 11, wherein the suction area includes a suction groove formed at a predetermined depth from the outer surface of the internal diffuser guide, an exhaust gas suction channel, and a slope having an incline formed in a direction radially opposite to a suction direction of the exhaust gas.

\* \* \* \* \*